US012564536B2

(12) United States Patent
Dai et al.

(10) Patent No.: US 12,564,536 B2
(45) Date of Patent: Mar. 3, 2026

(54) DETACHABLE PNEUMATIC THERAPEUTIC APPARATUS

(71) Applicant: JKH Health Co., Ltd., Shenzhen (CN)

(72) Inventors: Quanqin Dai, Diamond Bar, CA (US); Pu Jiang, Shenzhen (CN)

(73) Assignee: JKH Health Co., Ltd., Shenzhen (CN)

( * ) Notice: Subject to any disclaimer, the term of this patent is extended or adjusted under 35 U.S.C. 154(b) by 309 days.

(21) Appl. No.: 17/061,310

(22) Filed: Oct. 1, 2020

(65) Prior Publication Data

US 2021/0236379 A1 Aug. 5, 2021

(51) Int. Cl.
*A61H 9/00* (2006.01)

(52) U.S. Cl.
CPC ... *A61H 9/0092* (2013.01); *A61H 2201/0207* (2013.01); *A61H 2201/0214* (2013.01); *A61H 2201/1207* (2013.01); *A61H 2201/1238* (2013.01); *A61H 2201/5071* (2013.01)

(58) Field of Classification Search
CPC .......... A61H 9/0092; A61H 2201/0207; A61H 2201/0214; A61H 2201/1207; A61H 2201/1238; A61H 2201/5071; A61H 2201/0157; A61H 2201/165; A61H 2201/5025; A61H 2201/5043; A61H 2201/5097; A61H 2205/06; A61H 2205/10; A61H 9/0078; A61F 7/00; A61F 7/007; A61F 2007/0029; A61F 2007/0039
See application file for complete search history.

(56) References Cited

U.S. PATENT DOCUMENTS

2008/0188915 A1* 8/2008 Mills ........................ A61F 7/007 607/112
2014/0046232 A1* 2/2014 Sham ........................ A61F 7/03 602/2
2014/0303533 A1* 10/2014 Zeutzius .............. A61H 9/0092 601/151
2018/0200140 A1* 7/2018 Ganske ................... B32B 27/40
2019/0262219 A1* 8/2019 Bennett ................ A61H 9/0078
2020/0113773 A1* 4/2020 Ramanan ............. A61H 9/0078
2020/0121545 A1* 4/2020 Parker, Sr. ........... A61H 9/0078

* cited by examiner

*Primary Examiner* — Kendra D Carter
*Assistant Examiner* — Arielle Wolff
(74) *Attorney, Agent, or Firm* — Arch & Lake LLP; Hao Tan; Shen Wang

(57) ABSTRACT

The invention relates to a detachable connection structure of a pneumatic therapeutic apparatus, wherein a host machine and a wrap form a detachable structure through a back buckle, so that the portability and the adaptability of the product are improved. Furthermore, the wrap can be replaced conveniently, the use cost of the product is reduced, and the service life of the product is prolonged. Also, the fact that the detachable connection structure has no external tubing increases convenience and reduces the tripping hazard, enhancing the safety and the reliability of the product.

4 Claims, 16 Drawing Sheets

DETACHABLE PNEUMATIC THERAPEUTIC APPARATUS

TECHNICAL FIELD

The invention relates to the technical field of pneumatic therapeutic apparatuses, in particular to a detachable pneumatic therapeutic apparatus.

BACKGROUND

The air pressure therapeutic instrument mainly offers circulating pressure to limbs and other treatment areas by inflating and deflating the air bag inside the wrap worn on the treatment area. The host machine and the wrap of the existing pneumatic therapeutic apparatus are generally of a non-detachable structure: The host machine and the wrap are connected by exposed lengthy tubing, or the host machine is directly mounted and fixed on the wrap. The tubing structure presents a tripping hazard and is inconvenient to use and manage, and the fixed structure limits application range because the same wrap is difficult and even impossible to meet different treatment areas of a human body. According to different treatment areas of a human body and different heights and sizes of a human body, the needed wraps are different. Therefore, if the host machine and the wrap cannot be detachable, they can only be replaced together, which causes the use cost to be very high.

SUMMARY

In view of the above, there is a need for a detachable pneumatic therapeutic apparatus between the host machine and the wrap with high portability and adaptability.

In order to solve the technical problems, the invention adopts the technical scheme that: a detachable pneumatic therapeutic apparatus comprises a host machine and a wrap with the detachable connection structure on the surface of the wrap containing an air bag. The host machine can be detachably connected with the wrap through the back buckle on the surface of the wrap.

Furthermore, the wrap is equipped with the supporting bracket between the wrap and the back buckle; the supporting bracket is fixed in the wrap; the back buckle is fixed to the wrap through the supporting bracket.

Also, the host machine is detachably connected to the wrap through the back buckle.

In addition, the host machine includes an air inflation/deflation module which is connected with an inflation/deflation tubing; an inflation/deflation port connected with the inflation/deflation tubing is arranged on the housing of the host machine; a second inflation/deflation tubing connected with the air bag inside the wrap is arranged on the back buckle; the inflation/deflation tubing on the back buckle is communicated with the inflation/deflation port on the host machine in a butt joint mode to form a closed channel when the host machine is attached to the back buckle.

Further, the pressure sensor is equipped in the host machine and connects to another tubing and connector; the housing of the host machine has the port for the pressure sensor tubing; and the back buckle is equipped with the port that can be connected to the pressure sensor tubing connector on the host machine. When the host machine attaches to the wrap through the back buckle, the pressure detection between the host machine and wrap forms the closed passageway.

One or more batteries are in the host machine, and the battery is a disposable battery or a rechargeable battery.

The wrap includes releasably mateable and adjustable fasteners, so that the wrap can be worn on the treatment area of a human body.

The host machine can optionally be equipped with an electrically conductive contact plate to control heating and/or cooling; the wrap can optionally be equipped with the heating and/or cooling components that connect to the electrically conductive contact on the back buckle. When the host machine is detachably connected to the wrap through the back buckle, the electrically conductive contact plate will electrically connect to the heating and/or cooling components inside the wrap through the electrically conductive contact on the back buckle. Then the electrically conductive contact will generate heating and/cooling on the surface of the wrap.

The host machine can also optionally be provided with a wireless receiver.

The invention has the beneficial effects as follows: the host machine attaches to the wrap through the back buckle and forms detachable construction, offering the improved portability and suitability. In addition, the detachable wraps for different treatment areas can be replaced conveniently and reduce the use cost of product.

DESCRIPTION OF REFERENCE NUMERALS

Figure 1:
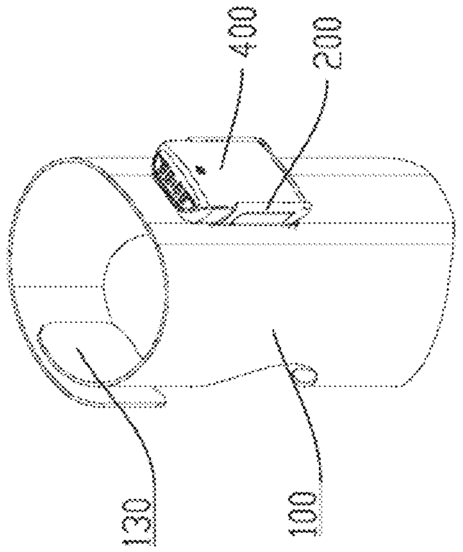
FIG. 1 is a schematic structural view of a detachable connection structure of a detachable pneumatic therapeutic apparatus according to an embodiment of the present invention.
Figure 2:
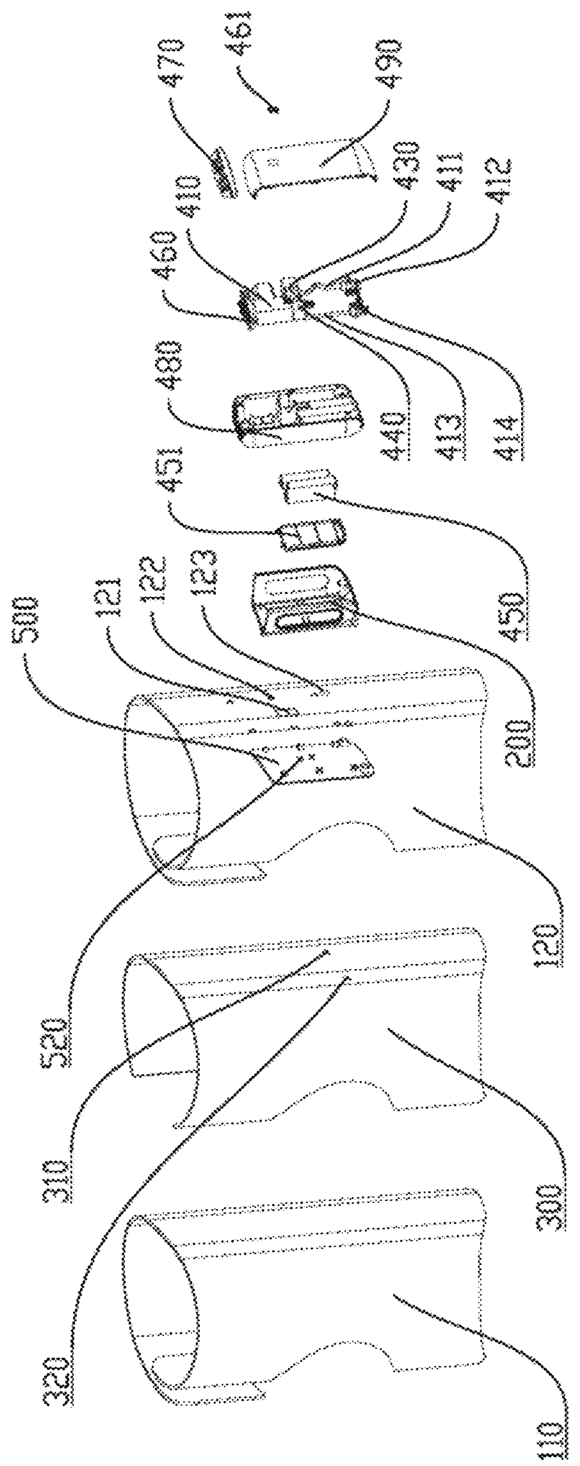
FIG. 2 is an exploded view of a detachable connection structure of a detachable pneumatic therapeutic apparatus according to a first embodiment of the present invention.

100. wrap; 110. inner layer; 120. outer layer; 121. contact avoiding hole; 122. mounting hole; 123. joint avoiding hole; 130. releasably mateable and adjustable fastener; 200. back buckle; 210. air flow tubing; 220. air pressure detection tubing; 230. loop fasteners; 240. sliding walls; 241. bending convex rail; 300. air bag; 310. air pressure nozzle; 320. air pressure detection nozzle; 400. host machine; 410. air inflation/deflation module; 411. inflation/deflation tubing; 412. inflation/deflation port; 413. pressure detection tubing; 414. pressure detection port; 420. conductive contact plate; 430. control valve; 440. pressure releasing valve; 450. battery; 451. battery cover; 460. control panel; 461. control button; 470. display screen; 480. lower housing; 490. upper housing; 491. sliding groove; 500. supporting bracket; 510. hook fastener; 520. conductive contact; 530. air flow tubing; 540. pressure detection connection tubing; 600. heating component; 700. cooling component; 800. separator; 900. fan.

DETAILED DESCRIPTION

In order to make the objects, technical solutions and advantages of the present invention more clearly understood, the following will explain in detail a detachable connection structure of a pneumatic therapeutic apparatus according to the present invention with reference to the accompanying drawings and embodiments. It should be understood that the specific embodiments described herein are merely illustrative of the invention and are not intended to limit the invention.

Example One

Referring to FIGS. 1 to 16, a detachable connection structure of a pneumatic therapeutic apparatus includes a back buckle 200 mounted on the surface of a wrap 100 containing one or more air bags 300; the host machine 400 is detachably connected with the back buckle 200 and forms an air path connection with the air bag 300 through the back buckle 200. The host machine 400 and the wrap 100 form a detachable structure through the back buckle 200, so that the portability and the adaptability of the product are improved, the wrap 100 is convenient to replace, the use cost of the product is reduced, and the service life of the product is prolonged.

Referring to FIGS. 2-7 and 15, a supporting bracket 500 is equipped between the wrap 100 and the back buckle 200, the supporting bracket 500 is fixedly connected to the wrap 100, and the back buckle 200 is fixed on the wrap 100 through the supporting bracket 500 to form an integrated wrap. Through the supporting bracket 500 is arranged, the back buckle 200 is conveniently fixed on the wrap 100, and the stability of the air tubing and/or the electric connection is improved. The supporting bracket 500 is fixedly connected with the wrap 100, and the back buckle 200 is detachably and fixedly connected with the supporting bracket 500. The back buckle 200 is provided with loop fasteners 230, the supporting bracket 500 is provided with some hook fasteners 510, and the loop fasteners 230 are matched and fixed with the hook fasteners 510. The supporting bracket 500 is provided to facilitate the installation of the back buckle 200.

The host machine 400 is connected to the components in the wrap 100 through the back buckle 200, so that the host machine 400 can control the components in the wrap 100 conveniently, and the host machine 400 can supply power to the components in the wrap 100 conveniently. Optionally, a conductive contact 420 can be arranged on the host machine 400, a port for exposing the conductive contact 520 is arranged on the back buckle 200, and the conductive contact plate 420 is electrically connected with the conductive contact 520 when the host machine 400 is attached to the back buckle 200; or, the host machine 400 is provided with the conductive contact plate 420, the supporting bracket 500 is provided with the conductive contact 520, the back buckle 200 is provided with a port for exposing the conductive contact 520, and the conductive contact plate 420 is electrically connected with the conductive contact 520 when the host machine 400 is attached to the back buckle 200. It is understood that the conductive contact 520 and the conductive contact plate 420 are connected in pairs, and each electrical connection is independently provided with at least one pair of the conductive contact 520 and the conductive contact plate 420. For example, one pair of the conductive contact 520 and the conductive contact plate 420 is provided for the electrical connection of the main machine 400 and the heating component 600, and the other pair of the conductive contact 520 and the conductive contact plate 420 is provided for the electrical connection of the host machine 400 and the cooling component 700. Generally, a control panel 460 is provided in the host machine 400, and the air inflation/deflation module 410, the battery 450, the optional heating component 600, the optional cooling component 700, the optional fan 900, and the like, are electrically connected to the control panel 460. The host machine 400 is further provided with a control button 461, and generally the control button 461 is electrically connected to the control panel 460 in a mechanical or touch contact manner.

Referring to FIGS. 2-8 and 16, an air inflation/deflation module 410 is included in the host machine 400, the air inflation/deflation module 410 is connected to an inflation/deflation tubing 411, an inflation/deflation port 412 connected to the inflation/deflation tubing 411 is arranged on a housing of the host machine 400, an air flow tubing 210 connected to the air bag 300 of the wrap 100 is arranged on the back buckle 200, and the air flow tubing 210 and the inflation/deflation port 412 are in a butt joint mode to form a closed channel when the host machine 400 is attached to the back buckle 200. The inflation/deflation tubing 411 is arranged in the host machine 400; no lengthy air tubing is between the host machine 400 and the back buckle 200, and the air connection without an external air tubing is convenient to use; in addition, the air tubing in the host machine is not easy to fall off and damage, and the safety and the reliability of the product are enhanced, resulting in a longer product life.

Generally, referring to FIGS. 1 to 8, 10 to 11, and 13 to 15, the housing of the host machine 400 includes a lower housing 480 and an upper housing 490, wherein the sliding walls 240 adapted to the shape of the lower housing 480 are arranged on both sides of the back buckle 200; the sliding walls 240 form a sliding channel, and the lower housing 480 is locked in the sliding channel. Particularly, the two sides of the lower housing 480 are arc-shaped and protrude outwards, and the arc-shaped sliding walls are clamped between the sliding walls 240 at the two sides of the back buckle 200, so that the back buckle 200 elastically clamps the lower housing 480, and the connection stability is improved. The slideway formed by the back buckle 200 is similar to a back clip of a pager, and the connection is convenient and quick. Specifically, referring to FIGS. 13 and 14, a bending convex rail 241 is connected to the sliding walls 240, and a sliding groove 491 is arranged on a surface of the upper housing 490 facing away from the back buckle 200 and adapted to the bending convex rail 241.

Or, the back buckle 200 is connected with the lower housing 480 in a buckling manner, the back buckle 200 is provided with a loop, the lower housing 480 is provided with a hook buckle matched with the loop, the detachable connection is realized through the buckling fit, the back buckle 200 can be simply provided with the hook buckle, and the lower housing 480 is provided with the loop matched with the hook buckle.

In the present invention, a pressure sensor is further provided in the host machine 400, and the pressure sensor is connected to the air bag 300 in the wrap 100 when the host machine 400 is attached to the back button 200. Referring to FIGS. 2-8 and 16, a pressure sensor is further provided in the host machine 400; a pressure detection tubing 413 connected to the pressure sensor is provided in the host machine 400; a pressure detection port 414 connected to the pressure detection tubing 413 is arranged on the housing of the host machine 400; an air pressure detection tubing 220 connected to the air bag 300 is provided on the back buckle 200; and the pressure detection port 414 and the air pressure detection tubing 220 are in a butt joint mode to form a closed channel when the host machine 400 is attached to the back buckle 200. The provision of a pressure sensor facilitates control of the air bag 300. The lower housing 480 and the upper housing 490 of the host machine 400 form an inner cavity; the lower housing 480 or the upper housing 490 is provided with a pressure detection port 414; the back buckle 200 is provided with an air pressure detection tubing 220; the pressure sensor is connected with the pressure detection port 414 through a pressure detection tubing 413; the air bag 300 is correspondingly provided with an air pressure detection nozzle 320; the air pressure detection nozzle 320 is connected with the air pressure detection tubing 220 of the back buckle 200; the pressure detection port 414 of the host machine 400 is connected to the air pressure detection tubing 220 of the back buckle 200 when the host machine 400 slides into the back buckle 200; and the pressure sensor is in a butt joint communication with the air bag 300 to form a closed channel when the host machine 400 is attached to the back buckle 200. The pressure sensors are arranged to detect the pressure of the air inflation/deflation module 410 and the pressure of the air bag 300 respectively, so that out-of-range pressure or abnormal pressure is avoided. The device can be stopped conveniently and timely, and the safety of the device is improved. Referring to FIGS. 2-14 and 16, the supporting bracket 500 is provided with an air flow tubing 530 for communicating the air pressure nozzle 310 with the air flow tubing 210; the air bag 300 in the bag body 100 is communicated with the air flow tubing 210 through the air pressure nozzle 310; and the air flow tubing 210 is communicated with an inflation/deflation tubing 411 of the host machine 400 through the inflation/deflation port 412 to form a closed air passage. the supporting bracket 500 is provided with a pressure detection connecting tubing 540 for connecting the air pressure nozzle 310 with the air pressure detection tubing 220, and the air pressure detection tubing 220 is communicated with a pressure detection tubing 413 on the host machine 400 through a pressure detection port 414.

Specifically, the back buckle 200 includes a connection panel connected to the supporting bracket 500, sliding walls 240 provided at both sides, and a bottom plate opposite to an entrance formed by the sliding walls 240. The loop fastener 230 is provided on the connection panel. The air flow tubing 210 is of an inverted L-shaped bent structure; one end of the air flow tubing protrudes from the connection panel to the wrap 100 and is in butt joint with the air pressure nozzle 310 of the air bag 300; and the other end of the air flow tubing protrudes from the bottom plate to the inlet direction and is in butt joint with the inflation/deflation port 412 of the host machine 400 to form a closed channel. The air pressure detection tubing 220 has an inverted L-shaped bent structure, one end of which protrudes from the connection panel toward the wrap 100 and is in butt joint with the air pressure detection nozzle 320 of the air bag 300; and the other end of air pressure detection tubing 220 protrudes from the bottom plate toward the inlet direction and is in butt joint with the pressure detection port 414 of the host machine 400 to form a closed channel. The conductive contact 520 on the supporting bracket 500 penetrates through the connection panel to be in contact with the conductive contact plate 420; the conductive contact plate 420 of the host machine 400 is arranged facing the connection panel; and the conductive contact 520 is generally connected with a spring and can be immersed in the connection panel; or, the conductive contact is of an inverted L-shaped bent structure, one end of the conductive contact protrudes from the connection panel to the wrap 100, the other end of the conductive contact protrudes from the bottom plate to the inlet direction and is in butt joint with the conductive contact plate 420 of the host machine 400 to form a closed channel, and the conductive contact plate of the host machine 400 is arranged facing the bottom plate.

Referring to FIGS. 2-8 and 16, the lower housing 480 and the upper housing 490 form an inner cavity, and an air inflation/deflation module 410 is provided in the inner cavity. The air inflation/deflation module 410 is connected to a control valve 430 and a pressure releasing valve 440, and the control valve 430 controls an inflation/deflation tubing 411 to control the inflation and deflation of the air bag 300. The pressure of the air bag 300 is adjusted by controlling the inflation and deflation of the air bag 300 through the control valve 430, and the control valve 430 can be a general solenoid valve; the pressure releasing valve 440 can prevent the air bag 300 from being damaged by the unrecoverable property of the air bag 300 caused by the out-of-range pressure of the air bag, so as to avoid injuring the treatment are of a human body; when the air pressure is higher than a preset threshold value, the pressure releasing valve 440 is opened to perform deflation, and the air pressure is reduced; when the air pressure is reduced to be lower than the preset threshold value, the pressure release valve 440 is closed; the effect of the pressure releasing valve 440 is to ensure that the air path from the air inflation/deflation module 410 to the air bag 300 works in a safe environment.

The host machine 400 can optionally be provided with a wireless receiver. Wireless connection is established with a remote controller or mobile communication terminal through the wireless receiver, further improving its flexibility of use and providing data display or control; general wireless communication mode can be Bluetooth or WIFI etc.

Referring to FIGS. 1-9 and 15, the wrap 100 is provided with a releasably mateable and adjustable fastener 130, so that the flexible wrap 100 is wrapped around the treatment area of a human body.

The releasably mateable and adjustable fastener 130 can be one of a hook and loop fastener, a snap fastener, a magnetic buckle, and a male and female plug. Preferably, the releasably mateable and adjustable fastener 130 is a hook and loop fastener, and the hook and loop fastener has a wide variation range and can be adapted to many treatment areas of a human body.

In a preferred embodiment of the present invention, the wrap 100 is a flexible fabric wrap, which is suitable for bending and is convenient to fit a curved surface of the treatment area. The wrap 100 comprises an inner layer 110 and an outer layer 120, wherein the inner layer 110 and the outer layer 120 are sewn or glued to enclose the air bag 300 in the cavity. Generally, the supporting bracket 500 is fixed between the outer layer 120 and the air bag 300; the hook fastener 510 on the supporting bracket 500 passes through the mounting hole 122 on the outer layer 120 to be connected with the loop fastener 230 on the back buckle 200 in a snap-fit manner; the conductive contact 520 on the supporting bracket 500 passes through the contact avoiding hole 121 on the outer layer 120 and the port on the back buckle 200 to be connected with the conductive contact plate 420 of the host machine 400; the air flow tubing 530 and the pressure detection connection tubing 540 on the supporting bracket 500 pass through the joint avoiding hole 123 on the outer layer 120 to be connected with the air flow tubing 210 on the back buckle 200, and the air flow tubing 210 is connected with the inflation/deflation tubing 411 in the host machine 400 through the inflation/deflation port 412.

In particular, the host machine 400 is optionally provided with a light/display and/or beeping reaction, so that a response prompt is given when the user operates the device.

Generally, the host machine 400 is further provided with a display screen 470, and the display screen 470 can be one of an LED screen, an OLED screen, an LCD adaptive display, or a nixie tube display. Various data are displayed through the display screen 470, and the control of an operator is facilitated.

Simply, the air bag 300 includes one or more bladder portions, each of which is typically inflated and held at a pressure point set simultaneously or independently.

The air inflation/deflation module 410 is generally an air pump, preferably an electric air pump.

Example Two

The second embodiment is further improved and expanded on the basis of the first embodiment:

referring to FIGS. 2-8, the wrap 100 includes an inner layer 110 and an outer layer 120, the air bag 300 is wrapped between the inner layer 110 and the outer layer 120, the supporting bracket 500 is fixed on a surface of the outer layer 120 facing the air bag 300, the back buckle 200 and the supporting bracket 500 are connected to a surface of the outer layer 120 facing away from the air bag 300, the host machine 400 is detachably connected to the back buckle 200, the host machine 400 is internally provided with a battery 450, the battery 450 is one or more disposable batteries (such as AA batteries), and a lower housing 480 of the host machine is provided with a battery compartment and a battery cover 451 for opening and closing the battery compartment. The control panel 460, the air inflation/deflation module 410, the pressure sensor and the like are powered by the disposable battery, so that the portable pneumatic therapeutic apparatus is convenient to power, and convenient to carry.

Example Three

Figure 3:
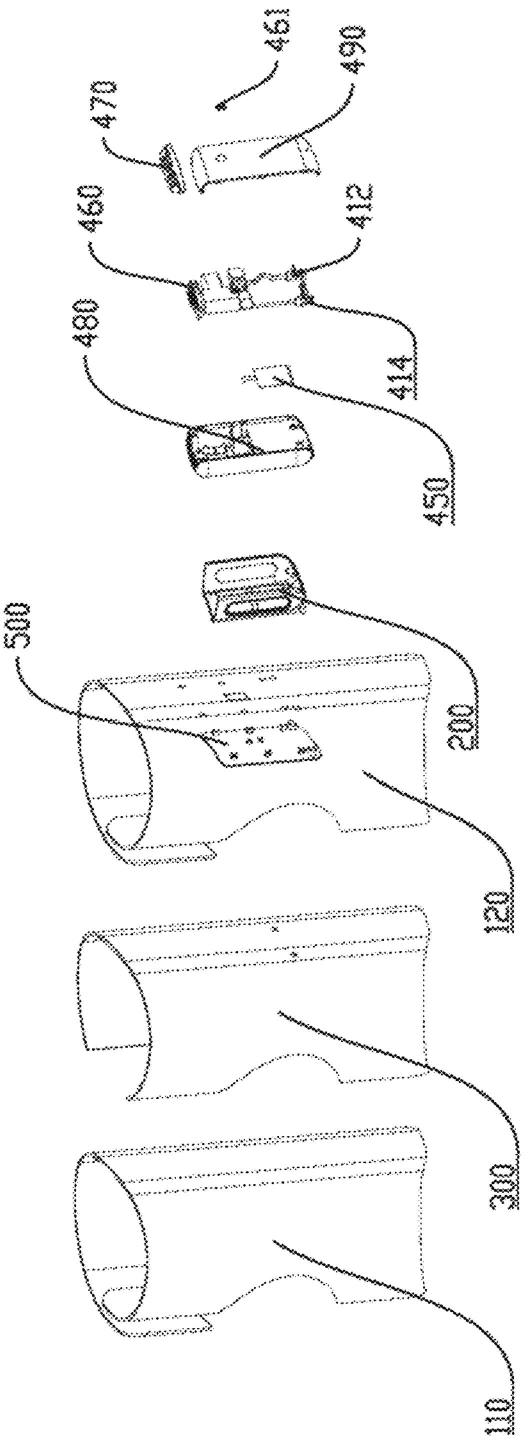
FIG. 3 is an exploded view of a detachable connection structure of a detachable pneumatic therapeutic apparatus according to a second embodiment of the present invention.

The third embodiment is an improvement and an expansion different from the second embodiment, and is different from the second embodiment in that:

referring to FIG. 3, the battery 450 in the host machine 400 is a rechargeable battery. The rechargeable battery generally employs a lithium battery or a cylindrical battery. Rechargeable battery's charging can be realized through the battery compartment and battery cover, through the power bank or other battery chargers, through the charging wire, or through the wireless charging mode.

The preferred host machine 400 is provided with a charging port on the outer housing, i.e. the lower housing 480 or the upper housing 490, and the charging port generally adopts micro-, Type-c or mini-USB interface.

Example Four

Figure 4:
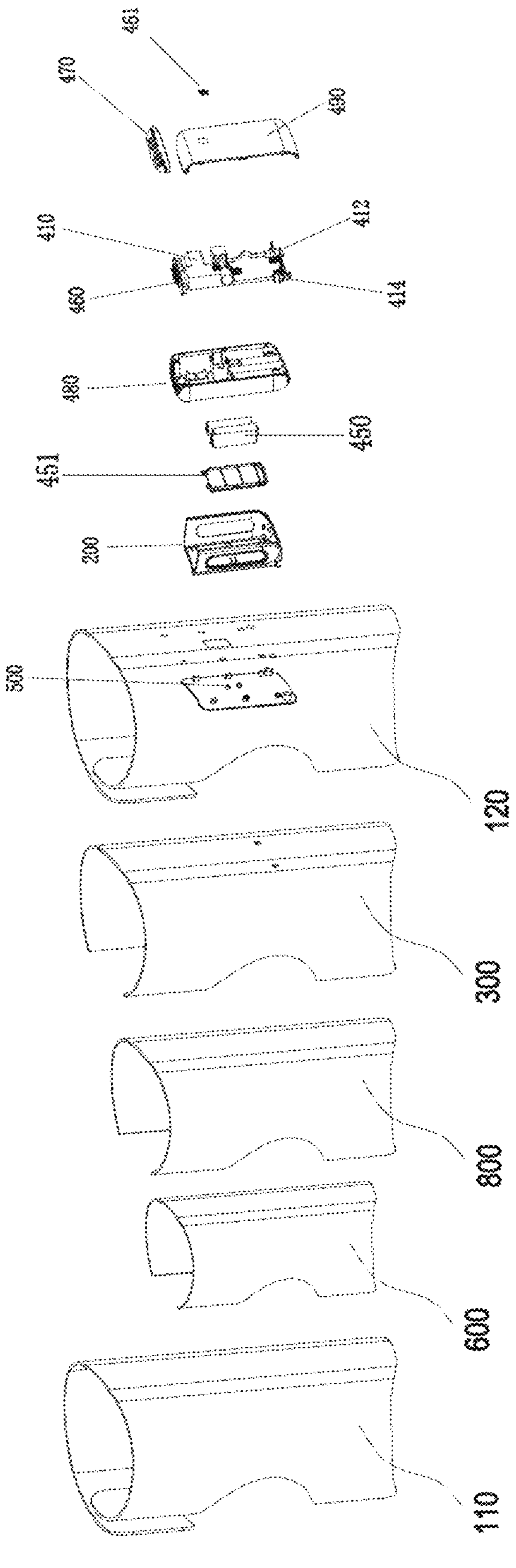
FIG. 4 is an exploded view of a detachable connection structure of a detachable pneumatic therapeutic apparatus according to a third embodiment of the present invention.

Example 4 is a further improvement and expansion on the basis of example two:

referring to FIG. 4, one or more disposable batteries 450 are provided in the host machine 400, and a battery compartment and a battery cover 451 for opening and closing the battery compartment are provided on the lower housing 480 of the host machine 400. The host machine is provided with a conductive contact plate 420; the back buckle 200 is provided with a port for exposing the conductive contact 520; when the host machine 400 is attached to the back buckle 200, the conductive contact plate 420 is electrically connected with the conductive contact 520 in a contact manner; the wrap 100 is internally provided with a heating component 600, and the conductive contact 520 is electrically connected with the heating component 600. The heating component 600 can provide heating to improve the therapeutic effect.

The conductive contact 520 may be directly arranged on the back buckle 200 and the supporting bracket 500 may be provided with a port for electrically connecting the conductive contact 520 and the heating component 600; alternatively, the conductive contact 520 may be arranged on the supporting bracket 500 and the back buckle 200 may be provided with a port for exposing the conductive contact 520.

Figure 10:
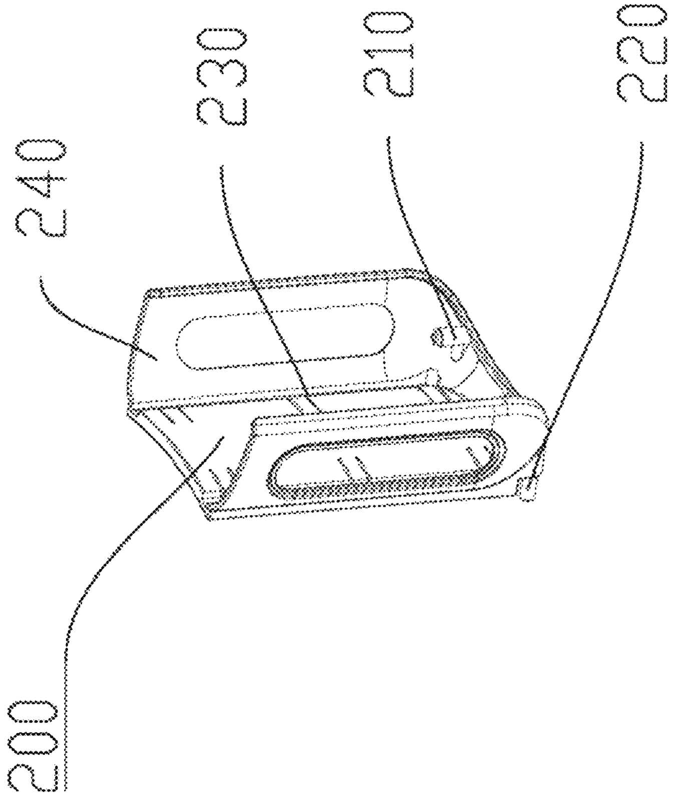
FIG. 10 is a schematic structural view of a back buckle of a detachable pneumatic therapeutic apparatus according to an embodiment of the present invention.
Figure 11:
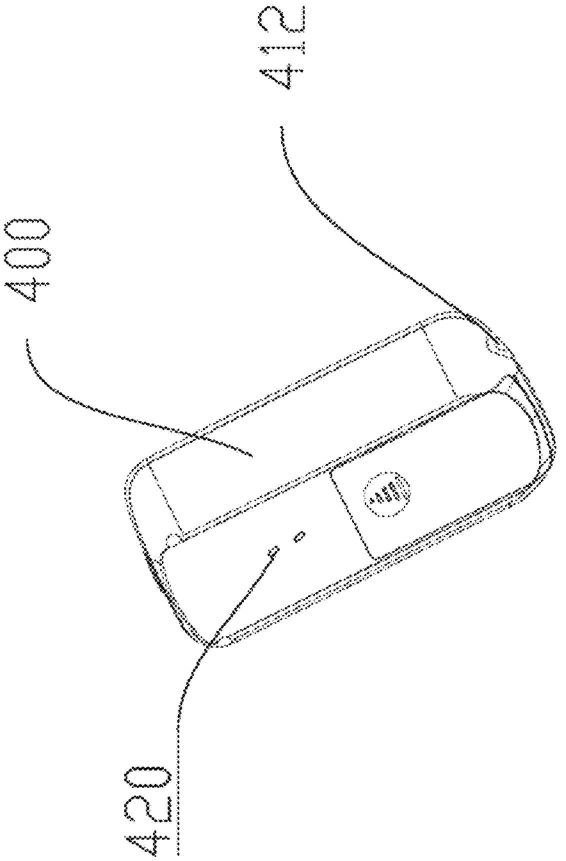
FIG. 11 is a schematic diagram of the external structure of a detachable pneumatic therapeutic apparatus according to an embodiment of the present invention.
Figure 12:
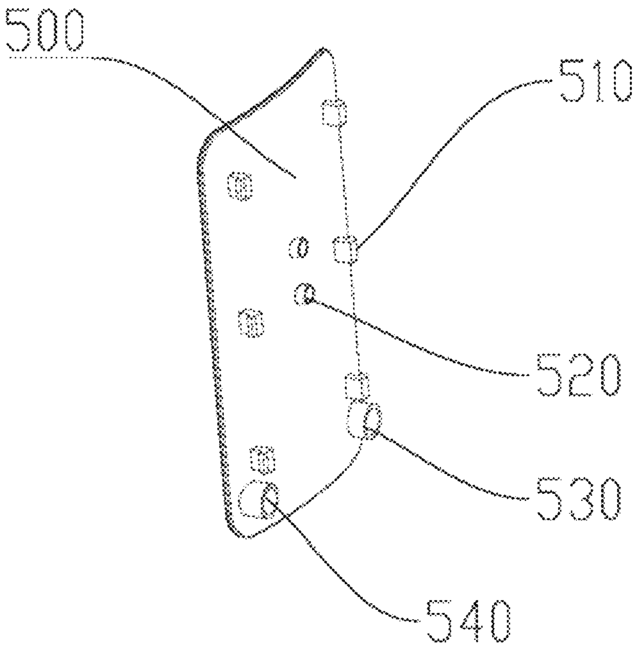
FIG. 12 is a schematic structural view of a supporting bracket of a detachable pneumatic therapeutic apparatus according to an embodiment of the present invention.
Figure 13:
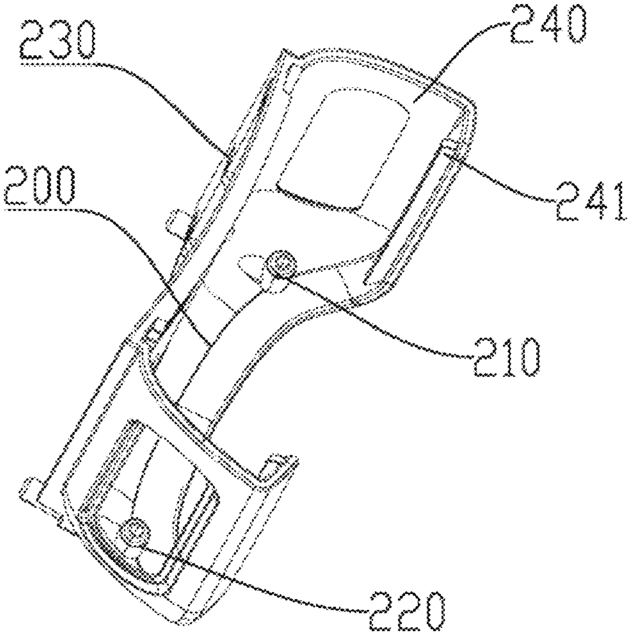
FIG. 13 is a schematic structural view of a back buckle of a detachable pneumatic therapeutic apparatus according to another embodiment of the present invention.
Figure 14:
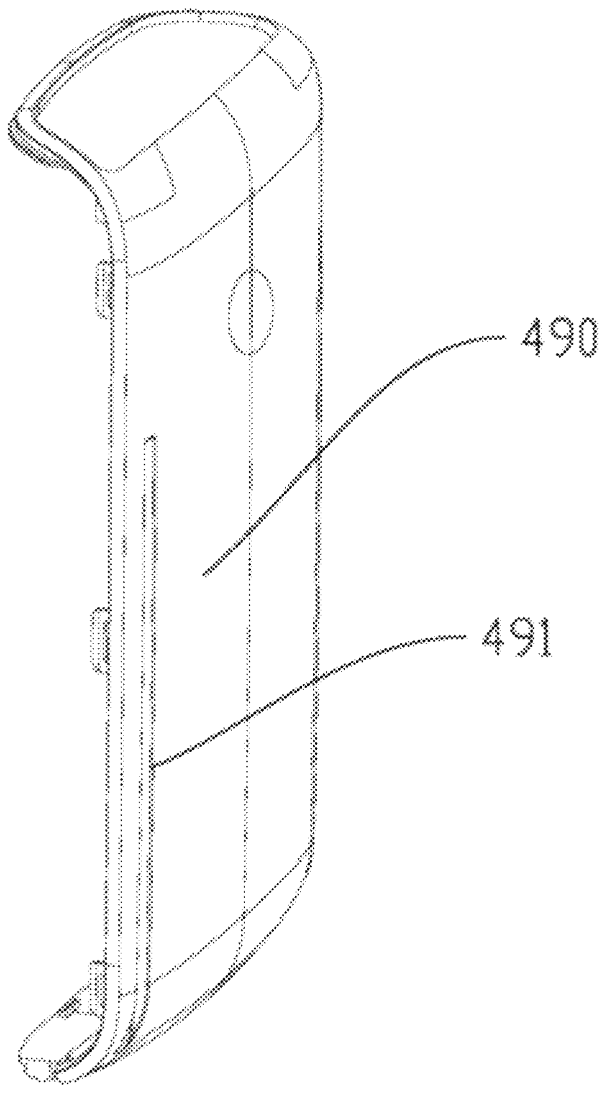
FIG. 14 is a schematic structural diagram illustrating an upper housing of a host machine of a detachable pneumatic therapeutic apparatus according to another embodiment of the present invention.
Figure 15:
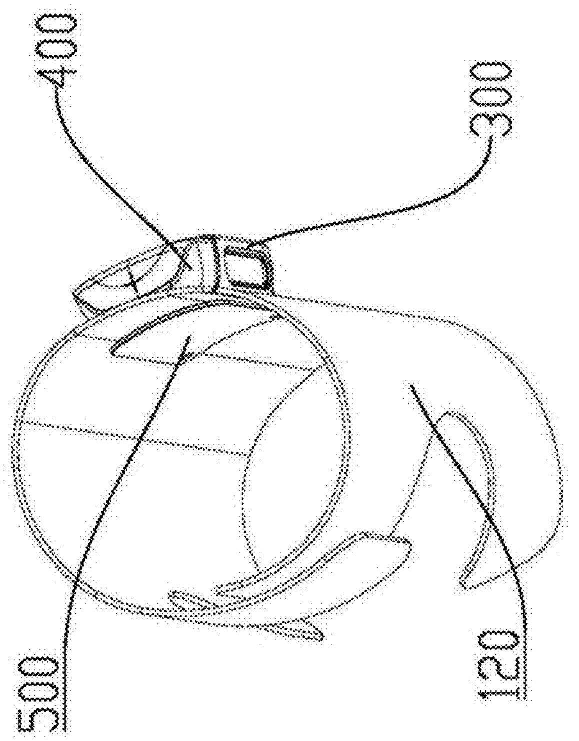
FIG. 15 is a schematic view of a detachable connection structure of a supporting bracket, a back buckle and a host machine of a detachable pneumatic therapeutic apparatus according to an embodiment of the present invention.
Figure 16:
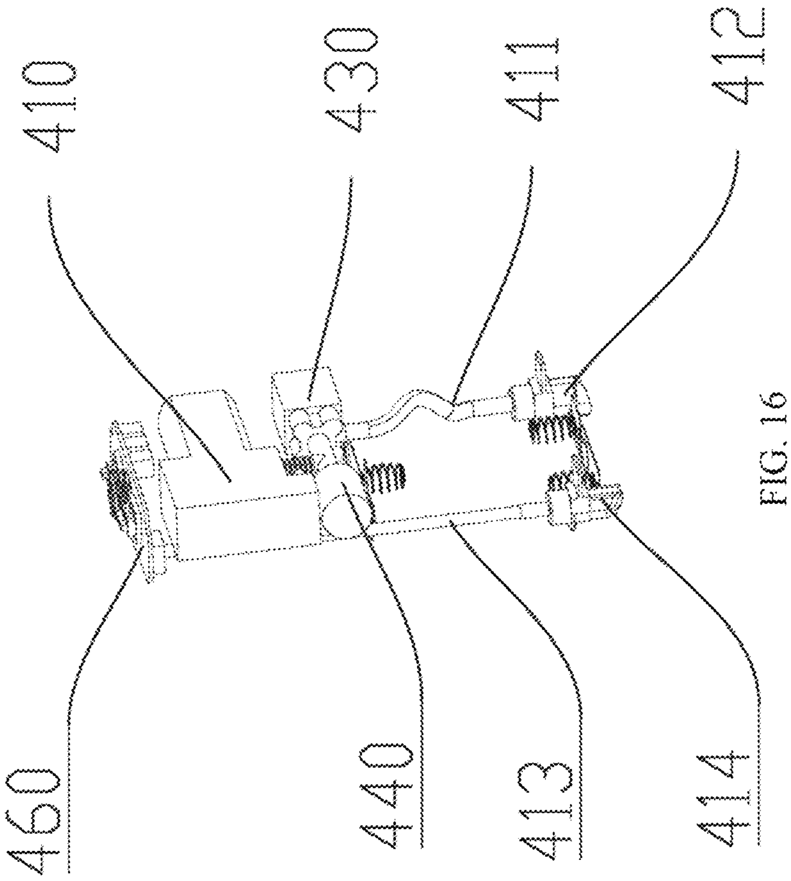
FIG. 16 is a schematic view of an internal structure of a host machine of a detachable pneumatic therapeutic apparatus according to an embodiment of the present invention.

Referring to FIGS. 10-12, a conductive contact plate 420 is arranged on the host machine 400; a conductive contact 520 is arranged on the supporting bracket 500; the conductive contact 520 is electrically connected to the heating component 600; a port for exposing the conductive contact 520 is arranged on the back buckle 200; the conductive contact plate 420 is electrically connected to the conductive contact 520 when the host machine 400 is connected to the back buckle 200; the heating component 600 is arranged in the wrap 100; and the heating component 600 is connected to the conductive contact 520 through wires.

Specifically, the wrap 100 is provided therein with a separator 800, and the separator 800 is provided between the air bag 300 and the heating component 600 to separate the air bag 300 and the heating component 600. The separator 800 is provided to protect the air bag 300, so unstable air pressure caused by temperature influence on the air bag 300 is avoided.

The soft circuit board and the wire of the heating component 600 are preferably suitable for bending with strong flexibility and thin thickness. The flexible printed circuit board is generally printed on a flexible insulating substrate by using a conductive material according to a designed circuit; and the conductive material generally includes conductive metals, conductive non-metals, conductive compounds, conductive mixtures, and the like, such as conductive graphene, conductive carbon paste, silver paste, copper; and the conductive wire includes conductive cloth, conductive silica gel, conductive fiber, and the like.

Example Five

Figure 5:
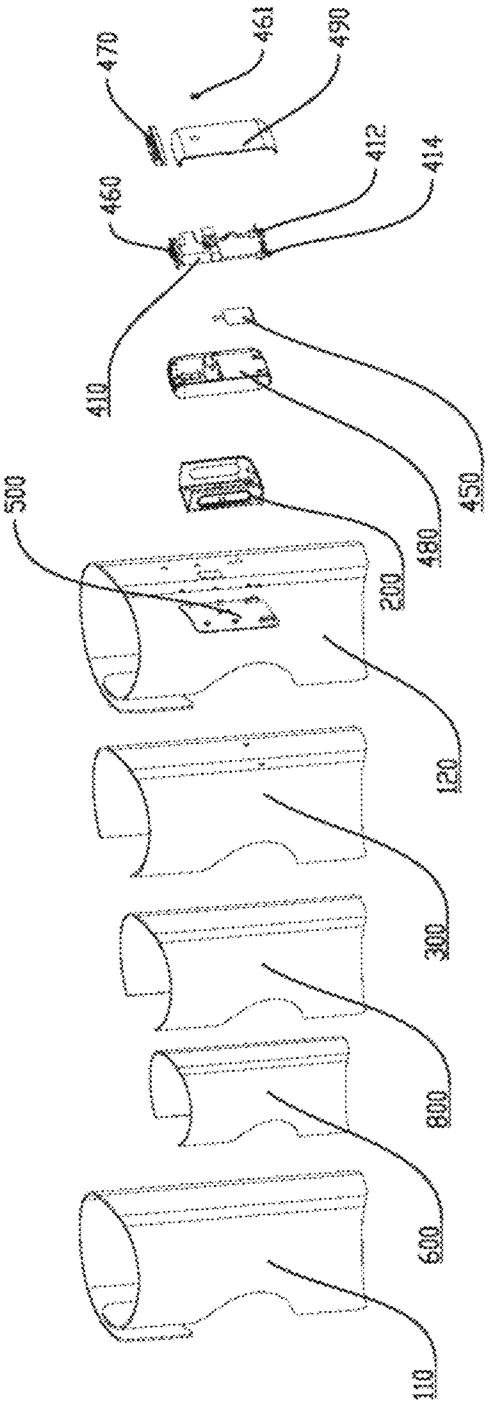
FIG. 5 is an exploded view of a detachable connection structure of a detachable pneumatic therapeutic apparatus according to a fourth embodiment of the present invention.

According to an aspect of the present invention, another modification is made on the basis of the third embodiment, referring to FIG. 5, the battery 450 in the host 400 is a rechargeable battery. The difference from the third embodiment is that:

Referring to FIG. 5, the conductive contact plate 420 is arranged on the host machine 400; the back buckle 200 is arranged with a port for exposing the conductive contact 520; when the host machine 400 is attached to the back buckle 200, the conductive contact plate 420 is electrically connected to the conductive contact 520; the heating component 600 is provided in the wrap 100, and the conductive contact 520 is electrically connected to the heating component 600. The heating component 600 can provide heating function to improve the therapeutic effect.

The conductive contact 520 may be directly arranged on the back buckle 200 and the supporting bracket 500 may be provided with a port for electrically connecting the conductive contact 520 and the heating component 600; alternatively, the conductive contact 520 may be arranged on the supporting bracket 500 and the back buckle 200 may be provided with a port for exposing the conductive contact 520.

Referring to FIGS. 10-12, a conductive contact plate 420 is arranged on the host machine 400; a conductive contact 520 is arranged on the supporting bracket 500; a port for exposing the conductive contact 520 is arranged on the back buckle 200; the conductive contact 520 is electrically connected to the heating component 600; the conductive contact plate 420 is electrically connected to the conductive contact 520 when the host machine 400 is attached to the back buckle 200; the heating component 600 is arranged in the wrap 100, and the heating component 600 is connected to the conductive contact 520 through wires.

Specifically, the wrap 100 is provided therein with a separator 800, and the separator 800 is provided between the air bag 300 and the heating component 600 to separate the air bag 300 and the heating component 600. The separator 800 is provided to protect the air bag 300, so unstable air pressure caused by temperature influence on the air bag 300 is avoided.

Example Six

Figure 6:
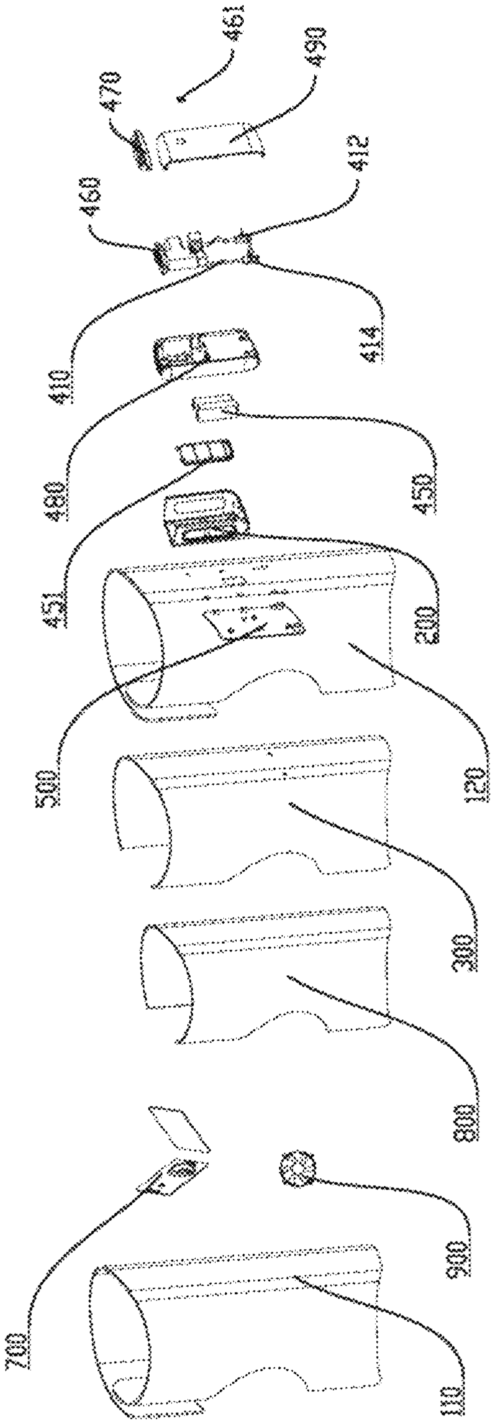
FIG. 6 is an exploded view of a detachable connection structure of a detachable pneumatic therapeutic apparatus according to a fifth embodiment of the present invention.

The embodiment is further improved and expanded on the basis of the second embodiment, and is different from the fourth embodiment in that:

Referring to FIG. 6, one or more disposable batteries 450 are provided in the host machine 400, and a battery compartment and a battery cover 451 for opening and closing the battery compartment are arranged on the lower housing 480 of the host machine 400. The inside of the wrap 100 is provided with a cooling component 700, and the cooling component 700 is connected with a corresponding conductive contact 520 through wires. The cooling component 700 is arranged, so that a cooling function is provided for a user, and the treatment effect is improved.

The wrap 100 is provided therein with a separator 800, and the separator 800 is provided between the cooling component 700 and the air bag 300 to separate the air bag 300 and the cooling component 700. The separator 800 is arranged between the cooling component 700 and the air bag 300, so that the cooling component 700 is prevented from influencing the air bag 300, and the safe use of the air bag 300 is ensured.

Referring to FIG. 6, a fan 900 is further arranged in the wrap 100; the fan 900 discharges heat of the cooling component 700 toward the back buckle 200, and the fan 900 is connected to the conductive contact 520 through wires. The fan 900 is arranged to transfer heat generated at the back of the cooling component 700, thereby improving the cooling effect. Simply, the air bag 300 is arranged to avoid the fan 900 or the fan 900 is arranged to avoid the air bag 300; particularly, the air bag 300 is provided with a window for the fan 900 to discharge air. The cooling component 700 and the fan 900 are connected with the conductive contact 520; the conductive contact 520 is connected with the conductive contact plate 420 to form an electrical connection; and the cooling component 700 and the fan 900 are generally connected with the same conductive contact 520, or can be respectively connected with the individual conductive contact 520 according to requirements.

The conductive contact 520 may be directly arranged on the back buckle 200 and the supporting bracket 500 may be provided with a port for electrically connecting the conductive contact 520 with the cooling component 700 and the fan 900; alternatively, the conductive contact 520 may be arranged on the supporting bracket 500 and the back buckle 200 may be provided with a port for exposing the conductive contact 520.

Referring to FIGS. 10 to 12, a conductive contact plate 420 is arranged on the host machine 400; a conductive contact 520 is arranged on the supporting bracket 500; a port for exposing the conductive contact 520 is arranged on the back buckle 200; the conductive contact 520 is electrically connected to the cooling component 700 and the fan 900; the conductive contact plate 420 is electrically connected to the conductive contact 520 when the host machine 400 is connected to the back buckle 200; the cooling component 700 and the fan 900 are arranged in the wrap 100, and the cooling component 700 and the fan 900 are connected to the conductive contact 520 through wires.

The cooling component 700 is generally a semiconductor refrigerating sheet, the refrigerating surface and the heat dissipating surface of which faces the inner layer 110 and the outer layer 120, respectively; and the fan 900 is arranged on the heat dissipating surface of the semiconductor refrigerating sheet.

Example Seven

The embodiment is further improved and expanded based on the third embodiment. Please refer to FIG. 7, the battery

Figure 7:
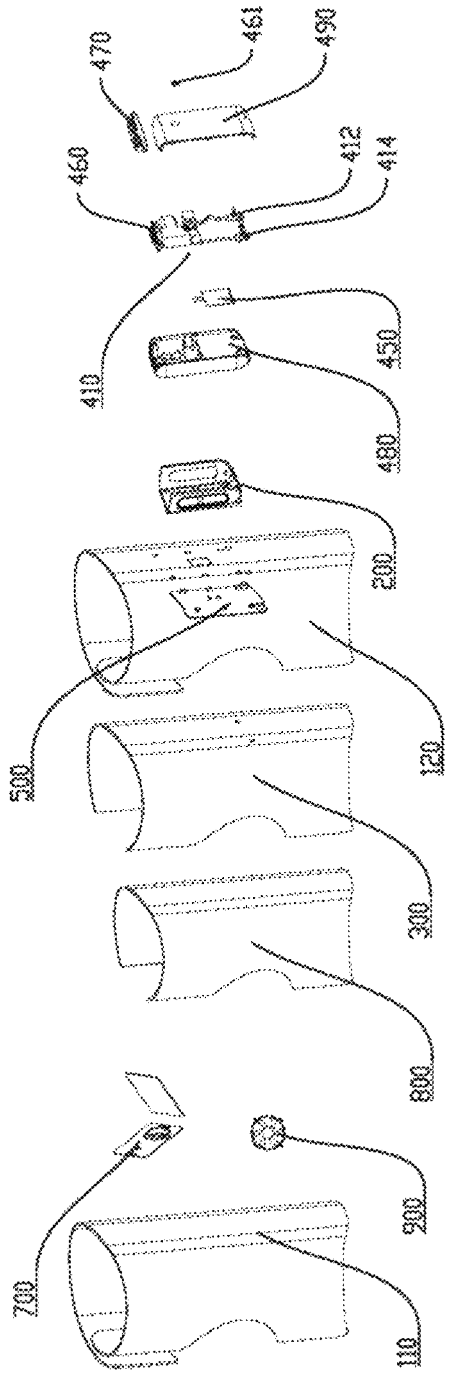
FIG. 7 is an exploded view of a detachable connection structure of a detachable pneumatic therapeutic apparatus according to a sixth embodiment of the present invention.
Figure 8:
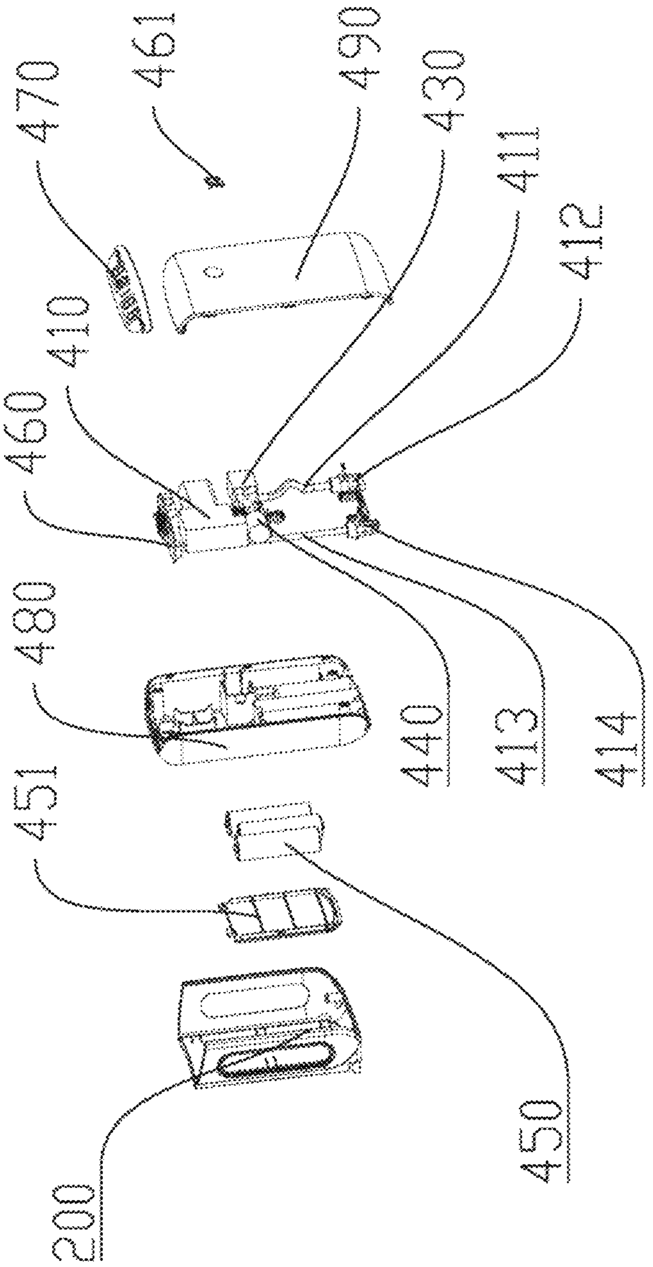
FIG. 8 is an exploded view of a host machine of a detachable pneumatic therapeutic apparatus according to an embodiment of the present invention.
Figure 9:
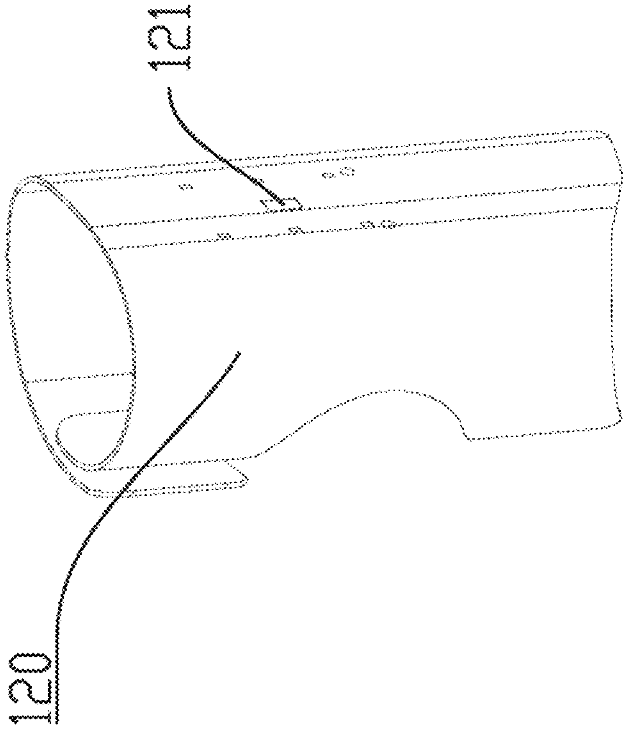
FIG. 9 is a schematic structural view of a wrap of a detachable pneumatic therapeutic apparatus according to an embodiment of the present invention.

450 in the host machine 400 is a rechargeable battery. And difference from example five is as follows:

Referring to FIG. 7, the inside of the wrap 100 is provided with a cooling component 700, and the cooling component 700 is connected to the corresponding conductive contact 520 through wires. The cooling component 700 is arranged, so that a cooling function is provided for a user, and the treatment effect is improved.

The wrap 100 is provided therein with a separator 800, and the separator 800 is provided between the cooling component 700 and the air bag 300 to separate the air bag 300 and the cooling component 700. The separator 800 is arranged between the cooling component 700 and the air bag 300, so that the cooling component 700 is prevented from influencing the air bag 300, and the safe use of the air bag 300 is ensured.

Referring to FIG. 7, a fan 900 is further arranged in the wrap 100; the fan 900 discharges heat of the cooling component 700 toward the back buckle 200, and the fan 900 is connected to the conductive contact 520 through wires. The fan 900 is arranged to transfer heat generated at the back of the cooling component 700, thereby improving the cooling effect. Simply, the air bag 300 is arranged to avoid the fan 900 or the fan 900 is arranged to avoid the air bag 300; particularly, the air bag 300 is provided with a window for the fan 900 to discharge air. The cooling component 700 and the fan 900 are connected with the conductive contact 520; the conductive contact 520 is connected with the conductive contact plate 420 to form an electrical connection; and the cooling component 700 and the fan 900 are generally connected with the same conductive contact 520, or can be respectively connected with the individual conductive contact 520 according to requirements.

Example Eight

Embodiment eight is an improvement and extension made according to another aspect of the invention:

The host machine 400 is provided with a conductive contact plate 420; the supporting bracket 500 is provided with a conductive contact 520; the back buckle 200 is provided with a port for exposing the conductive contact 520; the host machine 400 is electrically connected with the conductive contact 520 in a contact manner when being connected; the wrap 100 is internally provided with a heating component 600 and a cooling component 700, and the heating component 600 and the cooling component 700 are connected with the conductive contact 520 through wires. Meanwhile, the heating component 600 and the cooling component 700 are arranged in the wrap 100, and the heating or cooling feature can be selected according to needs, so that more choices are provided, and the application is enhanced.

The wrap 100 is internally provided with a separator 800; the air bag 300, the separator 800, the heating component 600, and the cooling component 700 are sequentially stacked.

The inside of the wrap 100 is provided with the cooling component 700; the inside of the wrap 100 is also provided with the fan 900; the fan 900 discharges the heat of the cooling component 700 towards the direction of the back buckle 200, and the fan 900 is connected with the conductive contact 520 through wires.

That is, the conductive contacts 520 and the conductive contact plates 420 are provided in two pairs: one pair makes the control board 460 of the host machine 400 be in electrical contact with the heat component 600 in the wrap 100, and the other pair makes the control board 460 of the host machine 400 be in electrical contact with the cooling component 700 and the fan 900 in the wrap 100. The battery 450 is electrically connected with the control board 460 to supply power to other components such as the two conductive contact plates 420, the control valve 430, the pressure releasing valve 440, the pressure sensor, and the display screen 470.

In conclusion, according to the detachable connection structure for the pneumatic therapeutic apparatus provided by the invention, the host machine and the wrap are simply and quickly attached and detached, so that the use convenience, portability and adaptability of the product are improved, the wrap is convenient to replace, the use cost of the product is reduced, and the service life of the product is prolonged.

Although the present invention has been described with reference to preferred embodiments, it should be understood that various changes, substitutions and alterations can be made herein without departing from the spirit and scope of the invention as defined by the appended claims.

What is claimed is:

1. A system of a detachable pneumatic therapeutic apparatus, comprising:

a detachable connection structure which includes a host machine and a wrap;

wherein the host machine is detachably connected to the wrap through a back buckle, wherein the back buckle comprises a connection panel connected to a supporting bracket, and sliding walls adopted to a shape of a housing of the host machine are provided at two sides of the back buckle, wherein the housing of the host machine comprises arc-shaped sliding walls at two sides of the housing that are configured to be clamped between the two sides of the back buckle;

wherein the back buckle is a fixed connecting structure arranged on a surface of the wrap containing one or more air bags;

wherein a bending convex rail is connected to the two sides of the back buckle, and a sliding groove is arranged on a surface of the housing facing away from the back buckle and adapted to cooperate with the bending convex rail to guide alignment of the back buckle and the housing:

wherein the supporting bracket is fixedly connected to the wrap;

wherein the back buckle is fixed to the wrap through the supporting bracket to form an integrated wrap with the detachable connection structure between the host machine and the wrap;

wherein the host machine can supply power to components in the wrap;

wherein the host machine has a control panel;

wherein the control panel is electrically connected to an air inflation/deflation module and a battery;

wherein the air inflation/deflation module is connected to an inflation/deflation tubing, and an inflation/deflation port connected to the inflation/deflation tubing is arranged on the housing of the host machine;

wherein a first air flow tubing is connected to the one or more air bags arranged on the back buckle, and one of the one or more air bags has an air pressure nozzle and an air pressure detection nozzle; and wherein the first air flow tubing and the inflation/deflation port are in a butt joint mode to form a closed channel when the host machine is attached to the back buckle;

wherein the back buckle is provided with loop fasteners, the supporting bracket is provided with hook fasteners, and the loop fasteners are matched with the hook fasteners to form the detachable connection structure between the host machine and the wrap;

wherein the supporting bracket comprises a second air flow tubing and a pressure detection connecting tubing, and the back buckle comprises an air pressure detection tubing, the second air flow tubing is for communicating the air pressure nozzle with the first air flow tubing, and the pressure detection connecting tubing is for connecting the air pressure detection nozzle with the air pressure detection tubing, and the air pressure detection tubing is communicated with a pressure detection tubing on the host machine through a pressure detection port, wherein the second air flow tubing and the pressure detection connection tubing on the supporting bracket pass through a joint avoiding hole on an outer layer of the wrap to be connected with the inflation/deflation tubing in the host machine through the inflation/deflation port, wherein the supporting bracket is fixed on an inner side of the outer layer of the wrap, the back buckle is fixed on an outer side of the outer layer of the wrap, the inner side of the outer layer of the wrap faces the one or more air bags, the outer side of the outer layer of the wrap faces away from the one or more air bags, and the joint avoiding hole is formed through the outer layer of the wrap and opens at the outer side;

wherein a mounting hole is provided on the outer layer of the wrap, the hook fasteners of the supporting bracket pass through the mounting hole to connect with the loop fasteners of the back buckle, and the mounting hole and the joint avoiding hole are provided on a same side of the outer layer of the wrap;

wherein the supporting bracket further comprises a conductive contact that penetrates through the connection panel on the back buckle to contact a conductive plate of the host machine facing the connection panel; and wherein the air pressure detection tubing of the back buckle is an inverted L-shaped bent structure.

2. A system of a detachable pneumatic therapeutic apparatus, comprising:

a detachable connection structure which includes a host machine and a wrap;

wherein the host machine is detachably connected to the wrap through a back buckle, wherein the back buckle comprises a connection panel connected to a supporting bracket, and sliding walls adopted to a shape of a housing of the host machine are provided at two sides of the back buckle, wherein the housing of the host machine comprises arc-shaped sliding walls at two sides of the housing that are configured to be clamped between the two sides of the back buckle;

wherein the back buckle is a fixed connecting structure arranged on a surface of the wrap containing one or more air bags;

wherein a bending convex rail is connected to the two sides of the back buckle, and a sliding groove is arranged on a surface of the housing facing away from the back buckle and adapted to cooperate with the bending convex rail to guide alignment of the back buckle and the housing:

wherein the back buckle is fixed to the wrap through the supporting bracket to form an integrated wrap with the detachable connection structure between the host machine and the wrap;

wherein one or more batteries are arranged in the host machine and the one or more batteries are rechargeable or disposable;

wherein the wrap is provided with releasably mateable and adjustable fasteners so the wrap can be worn on the treatment area;

wherein the host machine is provided with a conductive contact plate;

wherein the back buckle is provided with a port for exposing a conductive contact;

wherein the conductive contact plate is electrically connected with the conductive contact when the host machine is attached to the back buckle;

wherein the wrap is internally provided with a heating component and a cooling component, and the conductive contact is electrically connected with the heating component and the cooling component; and wherein a separator is provided between the heating component, the cooling component, and the one or more air bags to separate the one or more air bags and the heating component and the cooling component, and the one or more air bags, the separator, the heating component, and the cooling component are sequentially stacked;

wherein the back buckle is provided with loop fasteners, the supporting bracket is provided with hook fasteners, and the loop fasteners are matched with the hook fasteners to form the detachable connection structure between the host machine and the wrap, wherein the supporting bracket comprises a second air flow tubing and a pressure detection connecting tubing, and the back buckle comprises an air pressure detection tubing, the second air flow tubing is for communicating an air pressure nozzle of one of the one or more air bags with a first airflow tubing, and the pressure detection connecting tubing is for connecting the air pressure detection nozzle of the air bag with the air pressure detection tubing, and the air pressure detection tubing is communicated with a pressure detection tubing on the host machine through a pressure detection port, wherein the second air flow tubing and the pressure detection connection tubing on the supporting bracket pass through a joint avoiding hole on an outer layer of the wrap to be connected with an inflation/deflation tubing in the host machine through an inflation/deflation port in the host machine, wherein the supporting bracket is fixed on an inner side of the outer layer of the wrap, the back buckle is fixed on an outer side of the outer layer of the wrap, the inner side of the outer layer of the wrap faces the one or more air bags, the outer side of the outer layer of the wrap faces away from the one or more air bags, and the joint avoiding hole is formed through the outer layer of the wrap and opens at the outer side;

wherein a mounting hole is provided on the outer layer of the wrap, the hook fasteners of the supporting bracket pass through the mounting hole to connect with the loop fasteners of the back buckle, and the mounting hole and the joint avoiding hole are provided on a same side of the outer layer of the wrap; and wherein the conductive contact that penetrates through the connection panel on the back buckle to contact the conductive plate of the host machine facing the connection panel.

3. The system of claim 2, further comprising:

wherein a separator is arranged in the wrap;

wherein the separator is arranged on the surface of one of the one or more air bags facing the heating component or the cooling component;

wherein a fan is coupled with the cooling component in the wrap, and the fan connected to the conductive contact via wires can discharge heat from the cooling component.

4. A system of a detachable pneumatic therapeutic apparatus, comprising:

a detachable connection structure which includes a host machine and a wrap;

wherein the host machine is detachably connected to the wrap through a back buckle, wherein the back buckle comprises a connection panel connected to a supporting bracket, and sliding walls adopted to a shape of a housing of the host machine are provided at two sides of the back buckle, wherein the housing of the host machine comprises arc-shaped sliding walls at two sides of the housing that are configured to be clamped between the two sides of the back buckle;

wherein the back buckle is a fixed connecting structure arranged a surface of the wrap containing one or more air bags;

wherein a bending convex rail is connected to the two sides of the back buckle, and a sliding groove is arranged on a surface of the housing facing away from the back buckle and adapted to corporate with the bending convex rail to guide alignment of the back buckle and the housing:

wherein the back buckle is fixed to the wrap through the supporting bracket to form an integrated wrap with the detachable connection structure between the host machine and the wrap;

wherein one or more batteries are arranged in the host machine, and the one or more batteries are rechargeable or disposable, wherein the wrap is provided with releasably mateable and adjustable fasteners so the wrap can be worn on the treatment area;

wherein the host machine is provided with a conductive contact plate;

wherein the back buckle is provided with a port for exposing a conductive contact:

wherein the conductive contact plate is electrically connected with the conductive contact when the host machine is attached to the back buckle;

wherein the wrap is internally provided with a heating component or a cooling component;

and the conductive contact is electrically connected with the heating component or the cooling element;

wherein a supporting bracket is provided with a conductive contact;

wherein the heating component or cooling component are connected with the conductive contact through wires:

wherein a separator is inside the wrap;

wherein the following are sequentially stacked: the one or more air bags, the separator, the heating component and the cooling component;

wherein a fan is present inside the wrap;

wherein the fan discharges the heat of the cooling component towards the back buckle;

wherein the fan is connected with the conductive contact through wires;

wherein the conductive contacts make a control board of the host machine be in electrical contact with the heating component: and wherein conductive contact plate make the control board of the host machine be in electrical contact with the cooling component, the fan, and the wrap;

wherein the back buckle is provided with loop fasteners, the supporting bracket is provided with hook fasteners, and the loop fasteners are matched with the hook fasteners to form the detachable connection structure between the host machine and the wrap;

wherein the supporting bracket comprises a second air flow tubing and a pressure detection connecting tubing, and the back buckle comprises an air pressure detection tubing, the second air flow tubing is for communicating an air pressure nozzle of one of the one or more air bags with a first airflow tubing, and the pressure detection connecting tubing is for connecting an air pressure detection nozzle of the air bag with the air pressure detection tubing, and the air pressure detection tubing is communicated with a pressure detection tubing on the host machine through a pressure detection port, wherein the second air flow tubing and the pressure detection connection tubing on the supporting bracket pass through a joint avoiding hole on an outer layer of the wrap to be connected with an inflation/deflation tubing in the host machine through an inflation/deflation port in the host machine, wherein the supporting bracket is fixed on an inner side of the outer layer of the wrap, the back buckle is fixed on an outer side of the outer layer of the wrap, the inner side of the outer layer of the wrap faces the one or more air bags, the outer side of the outer layer of the wrap faces away from the one or more air bags, and the joint avoiding hole is formed through the outer layer of the wrap and opens at the outer side;

wherein a mounting hole is provided on the outer layer of the wrap, the hook fasteners of the supporting bracket pass through the mounting hole to connect with the loop fasteners of the back buckle, and the mounting hole and the joint avoiding hole are provided on a same side of the outer layer of the wrap; and wherein the conductive contact penetrates through the connection panel on the back buckle to contact the conductive plate of the host machine facing the connection panel.

* * * * *